United States Patent
Kusama et al.

(10) Patent No.: US 7,423,237 B2
(45) Date of Patent: Sep. 9, 2008

(54) METHOD OF CUTTING LAMINATED GLASS WITH LASER BEAMS

(75) Inventors: Hideaki Kusama, Kanagawa (JP); Toshio Inami, Kanagawa (JP); Naoyuki Kobayashi, Kanagawa (JP)

(73) Assignee: The Japan Steel Works, Ltd., Tokyo (JP)

( * ) Notice: Subject to any disclaimer, the term of this patent is extended or adjusted under 35 U.S.C. 154(b) by 402 days.

(21) Appl. No.: 10/551,760

(22) PCT Filed: Oct. 25, 2004

(86) PCT No.: PCT/JP2004/015779

§ 371 (c)(1),
(2), (4) Date: Oct. 3, 2005

(87) PCT Pub. No.: WO2005/042421

PCT Pub. Date: May 12, 2005

(65) Prior Publication Data

US 2006/0201983 A1 Sep. 14, 2006

(30) Foreign Application Priority Data

Oct. 31, 2003 (JP) ............................. 2003-372155

(51) Int. Cl.
*B23K 26/38* (2006.01)
(52) U.S. Cl. ...................... 219/121.72; 225/2

(58) Field of Classification Search ............ 219/121.67, 219/121.72; 225/1, 2, 93.5, 96
See application file for complete search history.

(56) References Cited

U.S. PATENT DOCUMENTS

| | | | |
|---|---|---|---|
| 3,410,979 A * | 11/1968 | Larsson | 219/121.71 |
| 6,512,196 B1 | 1/2003 | Yoon et al. | |
| 6,576,870 B2 * | 6/2003 | Wu | 219/121.72 |
| 2002/0125232 A1 * | 9/2002 | Choo et al. | 219/121.69 |
| 2002/0170896 A1 * | 11/2002 | Choo et al. | 219/121.72 |
| 2003/0006221 A1 * | 1/2003 | Hong et al. | 219/121.72 |
| 2003/0052098 A1 * | 3/2003 | Kim et al. | 225/93.5 |
| 2003/0146197 A1 | 8/2003 | Jeon | |

FOREIGN PATENT DOCUMENTS

| | | | |
|---|---|---|---|
| DE | 4230811 A1 * | 3/1994 |
| DE | 19846368 C1 * | 4/2000 |
| EP | 1 415 959 | 5/2004 |
| JP | 5-32428 | 2/1993 |
| WO | 03/006391 | 1/2003 |
| WO | 03/008352 | 1/2003 |
| WO | 03/026861 | 4/2003 |
| WO | 03/076119 | 9/2003 |

\* cited by examiner

*Primary Examiner*—Geoffrey S Evans
(74) *Attorney, Agent, or Firm*—Wenderoth, Lind & Ponack, L.L.P.

(57) ABSTRACT

A first laser beam (2) and a second laser beam (3) composed of an ultraviolet laser are irradiated from a side of a second glass member (5b), allowing the first laser beam (2) to pass through the second glass member (5b) so as to condense the first laser beam (2) on the first glass member (5a) to form a first scribe line (14), condensing the second laser beam (3) on the second glass member (5b) to form a second scribe line (15), and applying a break force to the first scribe line (14) and the second scribe line (15) to cut the glass.

4 Claims, 5 Drawing Sheets

(A)    (B)

(A)            (B)

X            X

METHOD OF CUTTING LAMINATED GLASS WITH LASER BEAMS

BACKGROUND OF THE INVENTION

1. Technical Field

The present invention relates to a method of cutting glass, and more specifically, to a method of cutting laminated glass.

2. Description of Related Art

As a conventional, typical method of cutting glass, as shown in FIG. 6, the following is known: a scribe line (notch line) 62 is formed on the surface of glass 60 with a blade 61 such as a diamond blade or a super-hard blade, and thereafter, a break force (shock separation force) 63 is applied from a rear surface to cut the glass 60 along the scribe line 62.

A method of cutting glass using a laser has been also known.

A method disclosed in Patent Document 1 involves, as shown in FIG. 7, irradiating the glass 60 with an infrared laser 74 shaped in an oval shape and transmitted through the glass with relative ease, and the vicinity of a rear side of a laser-irradiated portion is cooled with a refrigerant 75 (aqueous coolant). More specifically, an initial crack is previously caused manually at a portion where the glass 60 is to be cut. Then, the laser 74 is irradiated from the portion and the vicinity of a rear side of the irradiated portion is being cooled with the refrigerant 75 in a liquid form (or gaseous form) while both of them are scanned on the glass 60. This allows the initial crack to develop in a desired cutting direction owing to the thermal distortion of the inside of the glass 60, whereby a scribe line 72 is formed. By applying a break force 73 from a rear surface of the glass 60 after the scribe line 72 is formed, the glass 60 is cut.

A method disclosed in Patent Document 2 utilizes an ultraviolet laser with high photon energy in place of the infrared laser 74 shown in FIG. 7. One ultraviolet laser beam is condensed with a lens, and a molecular bond inside glass is directly broken, whereby a scribe line is formed without causing an initial crack. Thus, the refrigerant 75 is not used. For breaking, an infrared laser is used instead of a mechanical shock.

Patent Document 3 proposes that laser light from various kinds of laser oscillators is divided in two systems, and linear laser light is applied to front and rear surfaces of a substrate. Examples of the substrate include a glass substrate and a quartz substrate for a liquid crystal display apparatus and a solar battery, and two substrates are laminated. The linear laser light forms scratching lines, i.e., scribe lines on two substrates simultaneously or successively, and the substrates on which the scribe lines are formed are irradiated with wide laser light, and thus heated and thermally distorted, whereby the substrates are separated or broken along the scribe lines. The linear laser light is shaped in a rectangular shape with a cylindrical lens array or the like.

Patent Document 1: JP 9-150286 A
Patent Document 2: JP 5-32428 A
Patent Document 3: JP 2001-179473 A

SUMMARY OF THE INVENTION

According to the method of cutting with the blade 61 such as a diamond blade or a super-hard blade, there are disadvantages in that micro cracks develop at a cutting portion during scribing or breaking to decrease the strength of glass, and particles are generated to scatter during cutting. Furthermore, the blade 61 is a consumable product, so that a cutting apparatus is stopped every time the blade 61 is exchanged.

In contrast, according to the cutting method using an infrared laser, although micro-cracks and particles can be prevented from being caused at the cutting portion, an initial crack needs to be formed in a portion from which a scribe line extends. Therefore, the operation is cumbersome, and for example, in the case of forming crossing scribe lines, if one scribe line is formed and then, a scribe line crossing the previous scribe line is formed, it is difficult to draw the scribe line at a crossing point. Consequently, an initial crack needs to be formed at the crossing point again, which makes the operation remarkably cumbersome. Furthermore, it is very difficult to select the strength of a laser and cooling conditions for extending a scribe line from an initial crack.

On the other hand, in the case of using an ultraviolet laser, provided that one ultraviolet laser beam is disclosed as shown in Patent Document 2, a scribe line is formed from each surface of glass in the case of irradiating laminated glass with the ultraviolet laser. Thus, in a scribe stage of laminated glass, the step of reversing the laminated glass is required for the purpose of irradiating front and rear surfaces of the glass with the ultraviolet laser.

Furthermore, the use of laser light in two systems enables laminated glass to be cut without reversing the glass. However, laser light is applied to one side and the other side of the laminated glass respectively, so that a light path needs to be ensured on the front and rear sides of the glass. This complicates the configuration of an apparatus and enlarges the apparatus. In addition, the operation of adjusting an irradiation position of laser light in two systems to the glass is performed on front and rear sides of the glass, which unavoidably results in the cumbersome operation.

The present invention has been made in view of the above-mentioned problems in conventional techniques, and provides the following configuration.

The present invention relates to a method of cutting glass in which a first glass member 5a and a second glass member 5b are laminated to each other via a spacer 5c, and a portion in which a light transmissive material is filled in between the two glass members 5a, 5b is cut, the method being characterized by including: irradiating a first laser beam 2 and a second laser beam 3 composed of an ultraviolet laser from a side of the second glass member 5b, allowing the first laser beam 2 to pass through the second glass member 5b to condense the first laser beam 2 on the first glass member 5a to form a first scribe line 14, condensing the second laser beam 3 on the second glass member 5b to form a second scribe line 15; and applying a break force to the first scribe line 14 and the second scribe line 15 to cut the glass.

According to the invention, the method of cutting glass is further characterized in that the first scribe line 14 is formed first, and then, the second scribe line 15 is formed on an upper side of the first scribe line 14.

According to the invention, the method of cutting glass is further characterized in that the first laser beam 2 and the second laser beam 3 are one of a linear beam and an oval beam.

As is understood from the above description, according to the method of cutting glass of the present invention, the following effects can be exhibited.

In accordance with the present invention, for scribing laminated glass, the transmittance characteristics of an ultraviolet laser with respect to glass are used effectively. Each laser beam is irradiated from a side of a second glass member so that a first laser beam passes through the second glass member and a light transmissive material to be condensed to a first glass member, whereby a first scribe line is formed, and a second laser beam is condensed to the second glass member to form a second scribe line, and thereafter, a break force is applied to cut the laminated glass. Therefore, it is not necessary to perform the step of reversing the laminated glass during breaking. Furthermore, the first and second laser beams are irradiated from one side of the laminated glass, so that a light path only needs to be ensured only on one side of the glass. Consequently, the configuration of an apparatus becomes simple, and the apparatus becomes small. In addition, the operation of adjusting an irradiation position of the laser beam in two systems to the glass is performed only on one side of the glass, which makes it easy to perform the operation. Furthermore, the two glass members, first and second glass members are cut simultaneously, whereby a break time is shortened remarkably, which enables the efficient cutting of the laminated glass.

Further, a laser beam is applied to the first glass member farther from the laser beam than the other to form a scribe line, and then, the same processing is performed with respect to a second glass member closer thereto. Through the processing, a scribe line can be formed exactly on the first glass member at a position overlapping with a scribe line on the second glass member without allowing light to scatter due to the scribe line formed on the second glass member.

Further, the irradiation shape of an ultraviolet laser to glass is set to be a linear beam or an oval beam, whereby a large region having a laser energy density optimum for scribing can be ensured on a scribe line without decreasing the original output of an ultraviolet laser, which remarkably increases a scribing speed and enhances the glass cutting efficiency.

BRIEF DESCRIPTION OF THE DRAWINGS

FIG. 3 is a view showing a linear beam and an oval beam according to the first embodiment of the present invention, in which FIG. 3(A) is a view showing a linear beam, and FIG. 3(B) shows an oval beam.

FIG. 4 is a view illustrating an overlapping state of laser beams according to the first embodiment of the present invention, in which FIG. 3(A) is a view showing an overlapping state of linear beams, and FIG. 3(B) is a view showing an overlapping state of oval beams.

DETAILED DESCRIPTION OF THE INVENTION

It is an object of the present invention to provide a method of cutting glass with a compact, simple apparatus, in which first and second laser beams are irradiated only from one side of laminated glass, and a light path only needs to be ensured only on one side of the glass.

First Embodiment

Figure 1:
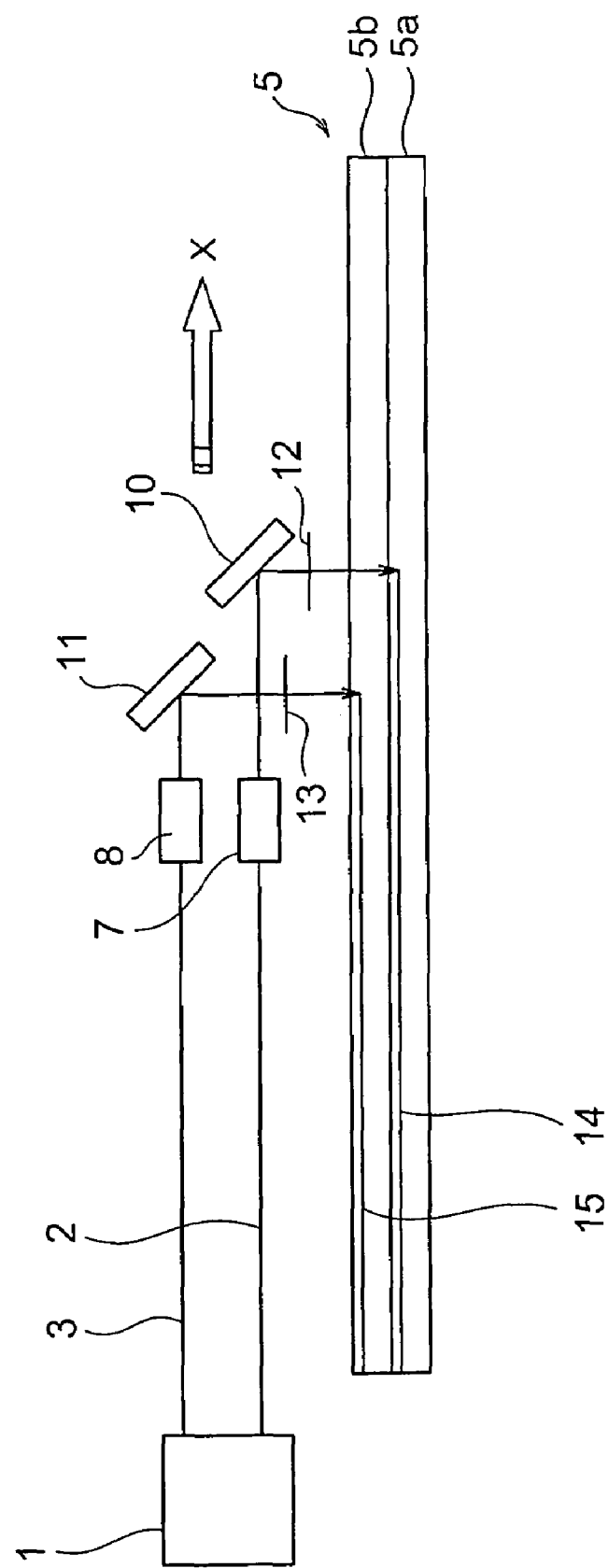
FIG. 1 is a schematic diagram showing a cutting apparatus used for implementing a method of cutting glass according to a first embodiment of the present invention.

FIGS. 1 to 4 show an apparatus for cutting glass according to a first embodiment of the present invention. In FIG. 1, reference numeral 1 denotes a laser oscillation apparatus. Scribe lines 14, 15 are formed on a substrate 5 with a first laser beam 2 and a second laser beam 3 composed of an ultraviolet laser emitted from the laser oscillation apparatus 1, and thereafter, the substrate 5 is cut. The laser oscillation apparatus 1 may be composed of an apparatus for emitting the first laser beam 2 and an apparatus for emitting the second laser beam 3. One laser light emitted from one laser oscillator may be split with a half mirror (not shown), and one light beam is set to be the first laser beam 2 and the other light beam is set to be the second laser beam 3. The laser oscillation apparatus 1 emits an ultraviolet laser; therefore, for example, an apparatus for generating the third harmonic of a Nd:YAG laser can be used.

Figure 2:
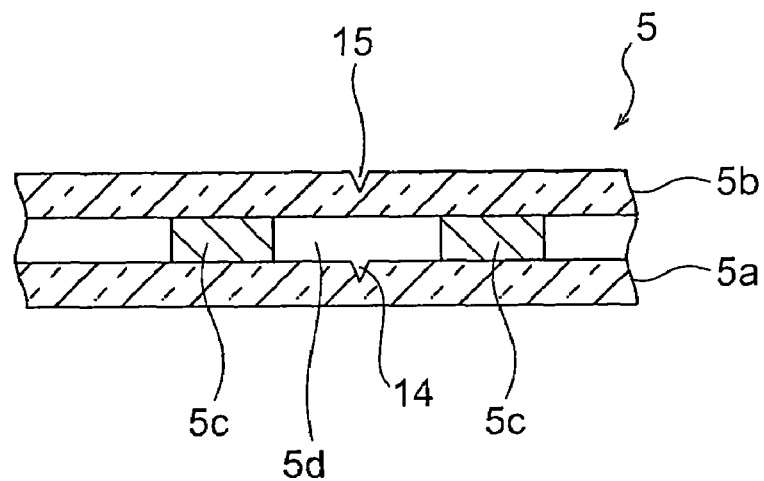
FIG. 2 is a cross-sectional view showing main portions of a substrate according to the first embodiment of the present invention.
Figure 3:
Figure 3:
Figure 4:
Figure 4:
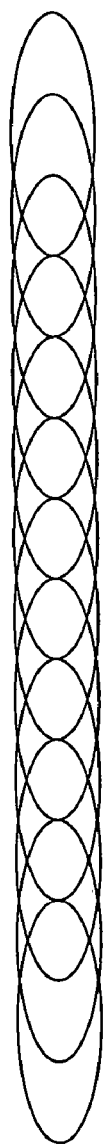

The substrate 5 is a substrate of a flat panel display such as a liquid crystal panel display. As shown in FIG. 2, two glass members 5a, 5b are laminated via spacers 5c, and a cutting portion 5d containing a light transmissive material is provided between the pair of spacers 5c and the first and second glass members 5a, 5b. Thus, the substrate 5 is laminated glass.

The first laser beam 2 and the second laser beam 3 are guided in parallel to one side (upper side in the figure) of the substrate 5, and respectively shaped in a linear or oval shape with beam shaping elements 7, 8. Then, the first and second laser beams 2 and 3 are deflected by 90° with respective mirrors 10, 11, and condensed with respective condensing lenses 12, 13, whereby they are irradiated to the substrate 1 from one side substantially vertically. The laser beams 2, 3 shaped with the beam shaping elements 7, 8 are linear beams shown in FIG. 3(A) or oval beams shown in FIG. 3(B).

The first laser beam 2 passing through one condensing lens 12 is irradiated to the substrate 5 from one side, passes through the second glass member 5b, and is condensed at a predetermined position of the first glass member 5a positioned on the lower side to form a first scribe line 14. The first laser beam 2 composed of an ultraviolet laser passes through the second glass member 5b with ease owing to the satisfactory glass transmittance, and when the first laser beam 2 is condensed at a predetermined position of the first glass member 5a, it directly breaks a molecular bond inside the glass to form the scribe line 14. The scribe line 14 is formed without generating an initial crack. A portion where the scribe line 14 is formed, i.e., a cutting portion of the substrate 5 is the cutting portion 5d containing a light transmissive material between the spacers 5c, 5c. Therefore, the first laser beam 2 composed of an ultraviolet laser passes through the second glass member 5b positioned on the upper side and the light transmissive material to reach the first glass member 5a positioned on the lower side satisfactorily and to be condensed in accordance with a focal position of the condensing lens 12. Needless to say, the first laser beam 2 is sufficiently dispersed so as to pass through the second glass member 5b without giving damage (photochemical reaction due to vaporization/evaporation and dissociation/ionization, etc.) thereto.

Figure 5:
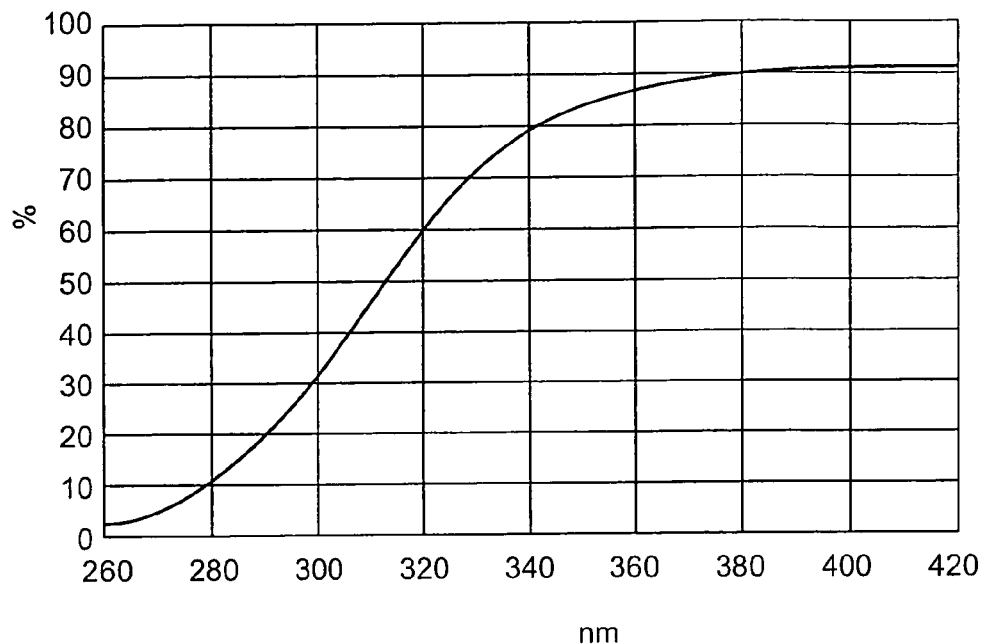
FIG. 5 is a line diagram showing wavelength-transmittance characteristics of ultraviolet light according to the first embodiment of the present invention.
Figure 6:
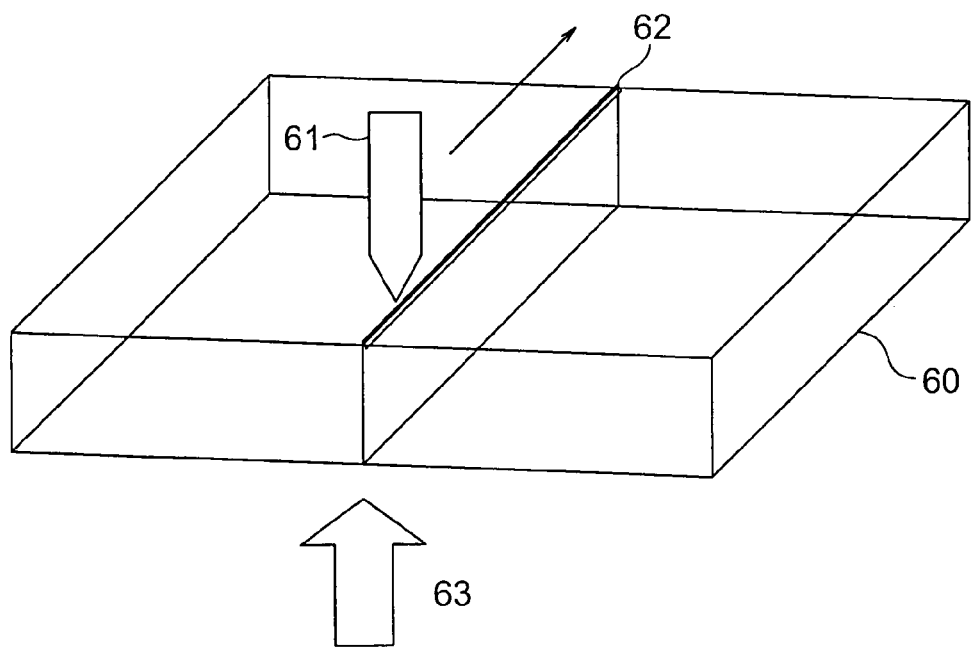
FIG. 6 is a perspective view showing a conventional cutting method.
Figure 7:
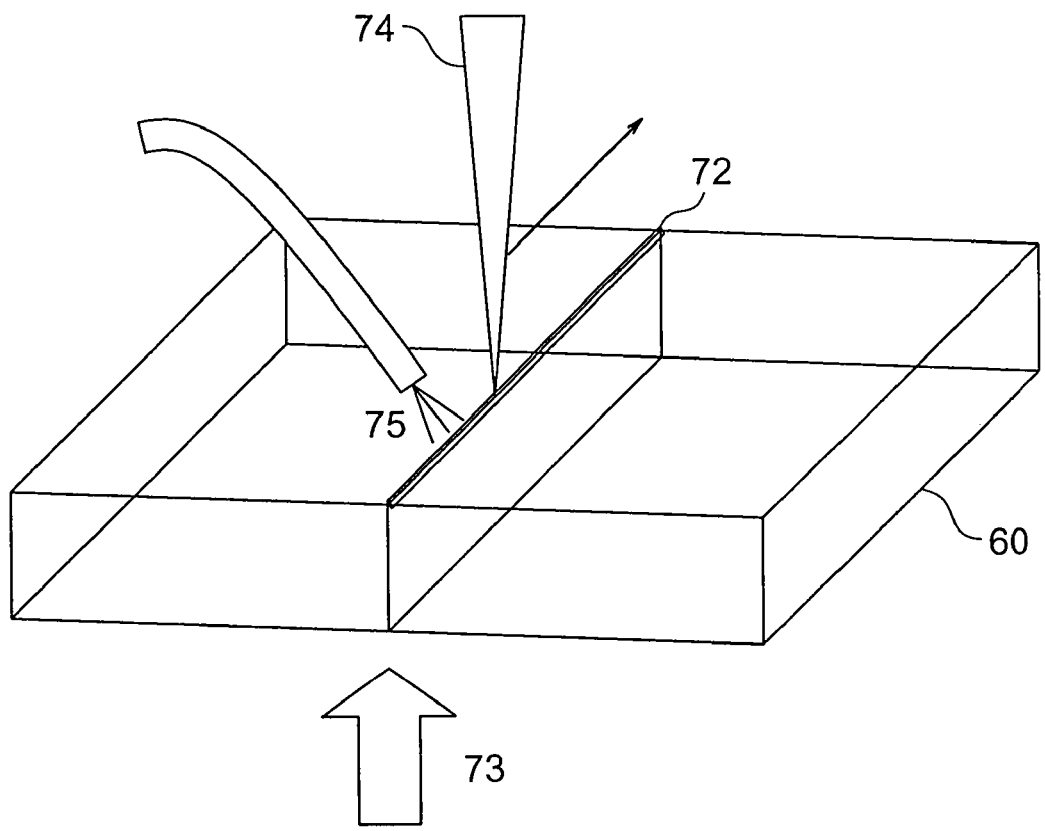
FIG. 7 is a perspective view showing a conventional cutting method.

Herein, the transmittance (%) of ultraviolet light with respect to glass for a flat panel display with a thickness of 0.7 mm is as shown in FIG. 5, and regarding the three-times harmonic (wavelength: 355 nm) of an ultraviolet laser, e.g., a Nd:YAG laser, about 85% thereof passes through the glass. Regarding a four-times harmonic (wavelength: 266 nm), the transmittance is about 5%, which is unsuitable as the first laser beam 2. Thus, as the first laser beam 2, an ultraviolet laser with a wavelength having a transmittance of 80% or more, preferably 85% or more is appropriate.

The second laser beam 3 passing through the other condensing lens 13 is applied to the substrate 5 from one side, and is condensed at a predetermined position of the second glass member 5b positioned on the upper side to form a second scribe line 15 similarly. A scribe direction X in which both the scribe lines 14, 15 are formed extends to the right in FIG. 1, and the first scribe line 14 is first formed, and then, the second scribe line 15 is formed. Usually, the second scribe line 15 is formed so as to overlap with the upper side of the first scribe line 14. If the first scribe line 14 to be formed on the first glass member 5a through the second glass member 5b is formed first, the first laser beam 2 passes through the second glass member 5b under the condition that the second scribe line 15 is not formed. Therefore, in the case of forming the second scribe line 15 so as to overlap with the upper side of the first scribe line 14, the first laser beam 2 is scattered by the scribe line 15 on the second glass member 5b, whereby the transmittance is reliably prevented from degrading.

The scribe direction X can be set through the relative movement between the substrate 5 and the first and second laser beams 2, 3. The substrate 5 is moved by moving a mounting board (not shown) for the substrate 5. Needless to say, it is not necessary to form a slit for allowing a laser beam to pass through on the mounting board for the substrate 5. The first and second laser beams 2, 3 can be moved by moving the laser oscillation apparatus 1, the beam shaping elements 7, 8, the mirrors 10, 11, and the condensing lenses 12, 13 in an integrated manner.

The laser beams 2, 3 composed of an ultraviolet laser are emitted in a pulsed form, and irradiated by being relatively moved in the scribe direction X with respect to the substrate 5 so as to appropriately overlap with each other. Therefore, the relative movement speed in the scribe direction X is set in such a manner that the linear beams shown in FIG. 3(A) and the oval beams shown in FIG. 3(B) overlap with each other at a predetermined interval up to a predetermined number of overlap times as shown in FIGS. 4(A) and 4(B), respectively. By setting the irradiation shape of an ultraviolet laser to glass to be a linear beam or an oval beam, a large region having a laser energy density optimum for scribing can be ensured on the scribe lines 14, 15 without decreasing the original output of an ultraviolet laser emitted from the laser oscillation apparatus 1, whereby the scribing speed can be increased.

In the case of using an ultraviolet laser, when a laser output is set too high, cracks develop in parallel to the scribe line and welding occurs again. Furthermore, non-uniform cracks develop vertically to the extending direction (X) of the scribe line. Consequently, at a time of breaking, a cut surface does not become uniform, and the strength of glass at that portion is weakened by at least two orders of magnitude due to the presence of cracks at a cutting portion edge on the scribed side. Therefore, an ultraviolet laser needs to be used with the output thereof suppressed to an appropriate value at which the depth and shape of a scribe line becomes optimum, instead of the maximum output.

More specifically, an ultraviolet laser is not irradiated to glass under the condition of being condensed in a circular shape with the output thereof suppressed to an optimum value for forming the scribe lines 14, 15, and the following is performed. An ultraviolet laser with the maximum output is shaped to a linear beam or an oval beam with such an output that gives an appropriate energy density, and is applied to the glass (substrate 5) at an optimum energy for forming the scribe lines 14, 15 with a large area, whereby the scribe lines 14, 15 are formed effectively. The ultraviolet laser with a short wavelength can be photochemically decomposed due to a large energy of one photon, and if an appropriate irradiation time is given at an appropriate energy density, fine processing with precision can be performed without having a large thermal effect on the periphery.

Accordingly, the movement amount per pulse of a linear beam or an oval beam can be obtained largely from the first laser beam 2 and the second laser beam 3 composed of an ultraviolet laser that is emitted in a pulsed form, and the time for forming the scribe lines 14, 15 required for cutting glass can be shortened.

The circular beam and the linear beam shown in FIG. 3(A) are given a size and an energy density optimum for scribing, and the scribing speeds are compared. In the case where the oscillation repetition frequency of a laser oscillator is the same, the scribing speed of the linear beam is (long side of a linear beam/diameter of a circular beam) times as high as the circular beam. Thus, the disadvantage involved in a pulse oscillation that the scribing speed becomes low, caused by using overlapping ultraviolet lasers of a pulsed form to form a scribe portion uniformly, can be eliminated substantially by matching the longitudinal direction of a linear beam or an oval beam with the scribe direction X.

More specifically, in the case of forming a scribe line in glass for a flat panel display with a thickness of 0.7 mm at pulse laser overlap times of 40, the energy density of a laser beam at portions for forming the scribe lines 14, 15 needs to be about 28 J/cm$^2$. Thus, the scan speed with a linear beam (rectangular beam) of 20 μm×40 μm becomes twice that of a square beam of 20 μm×20 μm at the same energy density.

Thus, the laser beams 2, 3 of an ultraviolet laser incident from one side (upper side in the figure) with respect to two glass plates of laminated glass are condensed at respective target portions, using the transmittance characteristics of an ultraviolet laser with respect to glass, whereby scribing can be performed simultaneously and efficiently. Needless to say, the step of reversing the laminated glass for scribing the laminated glass is not necessary.

In particular, a slight time delay is set between irradiations with the two laser beams 2, 3, and under this condition, an ultraviolet laser is irradiated to the overlapping position of the first glass member 5a and the second glass member 5b of the substrate 5 composed of laminated glass, whereby a scribe line can be formed substantially simultaneously and at a high speed. It is desirable that the energy profile of the laser beams 2, 3 is a flat linear beam. The laser beams 2, 3 of this type can be formed through splitting and overlapping of laser beams, shaping of a laser beam with a rectangular kaleidoscope, or shaping of a kinoform phase control plate.

The substrate 5 that is laminated glass in which the scribe lines 14, 15 are thus formed is cut along the scribe lines 14, 15 in the step of breaking. As breaking means in the step of breaking, conventionally known means can be adopted, and any one of a mechanical shock, cooling with a refrigerant in a liquid or gaseous form, and irradiation with an infrared laser can be used. By applying a break force by the breaking means to the substrate 5 in which the scribe lines 14, 15 are formed from front and rear surfaces, and cutting the first and second glass members 5a, 5b simultaneously, the substrate 5 can be divided into a plurality of pieces along the scribe lines 14, 15. Thus, a time required for cutting glass is shortened remarkably.

In FIG. 1, the respective laser beams 2, 3 are condensed on one side (upper surface portion in the figure) of the respective glass members 5a, 5b. However, the following can also be performed. By adjusting the focal positions of the condensing lenses 12, 13, the respective laser beams 2, 3 are condensed on the other side (lower surface portion in the figure) of the respective glass members 5a, 5b to form scribe lines (14, 15), and a break force is applied to the portions of the scribe lines (14, 15), whereby the substrate 5 is cut.

The present invention is also applicable to laminated glass of two or more layers, instead of two-layered laminated glass.

The invention claimed is:

1. A method of cutting glass in which a first glass member and a second glass member are laminated to each other via a spacer, and a portion in which a light transmissive material is filled in between the two glass members is cut, the method comprising:

irradiating a first laser beam and a second laser beam composed of an ultraviolet laser from a side of the second glass member the first laser beam passing through the second glass member to condense the first laser beam on the first glass member to form a first scribe line, condensing the second laser beam on the second glass member to form a second scribe line; and applying a break force to the first scribe line and the second scribe line to cut the glass.

2. A method of cutting glass according to claim 1, wherein the first scribe line is formed first, and then, the second scribe line is formed on an upper side of the first scribe line.

3. A method of cutting glass according to claim 1, wherein the first laser beam and the second laser beam are one of a linear beam and an oval beam.

4. A method of cutting glass according to claim 2, wherein the first laser beam and the second laser beam are one of a linear beam and an oval beam.

* * * * *